United States Patent
Ye et al.

(10) Patent No.: US 11,936,930 B2
(45) Date of Patent: Mar. 19, 2024

(54) DATA PROCESSING METHOD, SERVER, AND DATA COLLECTION DEVICE

(71) Applicant: HUAWEI TECHNOLOGIES CO., LTD., Shenzhen (CN)

(72) Inventors: Haonan Ye, Nanjing (CN); Jian Cheng, Nanjing (CN); Jian Chen, Nanjing (CN); Gang Chen, Beijing (CN); Zhenhang Sun, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 396 days.

(21) Appl. No.: 16/986,887

(22) Filed: Aug. 6, 2020

(65) Prior Publication Data

US 2020/0366948 A1  Nov. 19, 2020

Related U.S. Application Data

(63) Continuation of application No. PCT/CN2018/124142, filed on Dec. 27, 2018.

(30) Foreign Application Priority Data

Feb. 9, 2018 (CN) .......................... 201810136559.5

(51) Int. Cl.
*H04N 21/24* (2011.01)
*H04L 43/55* (2022.01)
(Continued)

(52) U.S. Cl.
CPC ......... *H04N 21/2407* (2013.01); *H04L 43/55* (2022.05); *H04L 49/205* (2013.01); *H04N 21/64738* (2013.01)

(58) Field of Classification Search
None
See application file for complete search history.

(56) References Cited

U.S. PATENT DOCUMENTS 7,403,487 B1 * 7/2008 Foladare ............. H04L 41/0896
 370/252
10,311,372 B1 * 6/2019 Hotchkies ........... H04L 67/1097
(Continued)

FOREIGN PATENT DOCUMENTS

CA    2805140 A1    12/2012
CN    101572829 A    11/2009
(Continued)

OTHER PUBLICATIONS

Pedro Casas et al,"On the Analysis of QoE-based Performance Degradation in YouTube Traffic",ISBN 978-3-901882-67-8, 10th CNSM and Workshop 2014 IFIP, Rio de Janeiro, Brazil, Nov. 17, 2014, total 10 pages. XP32724802.
(Continued)

*Primary Examiner* — Ricky Chin
(74) *Attorney, Agent, or Firm* — Rimon PC

(57) ABSTRACT

A data processing method, a server, and a data collection device are provided. The method includes: obtaining, by a server, first network key performance indicator KPI data and performance data of a first set-top box STB, where the first network KPI data is network KPI data of a first video service stream, and the first STB is an STB that receives the first video service stream; and calculating, by the server, first video quality of experience QoE of the first video service stream based on an associated model, the first network KPI data, and the performance data of the first STB, where the associated model is a model obtained through training based on historical data, and the associated model is used by the server to calculate video QoE based on network KPI data and performance data of an STB.

8 Claims, 7 Drawing Sheets

(51) Int. Cl.
*H04L 49/20* (2022.01)
*H04N 21/647* (2011.01)

(56) References Cited

U.S. PATENT DOCUMENTS

| | | | | |
|---|---|---|---|---|
| 10,375,192 | B1* | 8/2019 | Lepeska | H04L 67/02 |
| 10,505,818 | B1* | 12/2019 | Yona | H04L 43/16 |
| 10,602,383 | B1* | 3/2020 | Horton | H04L 41/0663 |
| 10,735,815 | B1* | 8/2020 | Zhan | H04N 21/2402 |
| 2010/0299433 | A1* | 11/2010 | De Boer | H04L 47/15 |
| | | | | 709/224 |
| 2012/0201310 | A1 | 8/2012 | Yamagishi et al. | |
| 2015/0006621 | A1 | 1/2015 | Westphal | |
| 2015/0163273 | A1 | 6/2015 | Radcliffe et al. | |
| 2016/0134723 | A1* | 5/2016 | Gupta | H04L 67/5651 |
| | | | | 709/247 |
| 2016/0277467 | A1* | 9/2016 | Rödbro | H04L 65/1069 |
| 2016/0373996 | A1* | 12/2016 | Yang | H04L 12/5691 |
| 2017/0054784 | A1* | 2/2017 | Panattu | H04L 43/08 |
| 2017/0104647 | A1* | 4/2017 | Chaiyochlarb | H04L 43/55 |
| 2017/0171636 | A1* | 6/2017 | Devlin | H04N 21/2402 |
| 2018/0109587 | A1* | 4/2018 | Spilka | H04L 65/613 |
| 2018/0191634 | A1* | 7/2018 | Karthikeyan | H04L 67/61 |
| 2018/0211172 | A1* | 7/2018 | Kirk | G06N 5/045 |
| 2018/0338187 | A1* | 11/2018 | Ketonen | H04L 43/50 |
| 2018/0376176 | A1 | 12/2018 | Matsumoto et al. | |
| 2019/0075477 | A1* | 3/2019 | Dion | H04W 24/08 |
| 2019/0098067 | A1* | 3/2019 | Sandoval | H04L 65/612 |
| 2019/0164084 | A1* | 5/2019 | Gulin | G06F 16/9027 |
| 2020/0067629 | A1* | 2/2020 | Xiong | H04L 1/0009 |
| 2022/0330095 | A1* | 10/2022 | Kim | H04N 21/6405 |
| 2022/0385955 | A1* | 12/2022 | Moorthy | H04N 21/2662 |

FOREIGN PATENT DOCUMENTS

| | | |
|---|---|---|
| CN | 102065339 A | 5/2011 |
| CN | 102685790 A | 9/2012 |
| CN | 103686218 A | 3/2014 |
| CN | 104113788 A | 10/2014 |
| CN | 104410516 A | 3/2015 |
| CN | 105491403 A | 4/2016 |
| CN | 107493509 A | 12/2017 |
| CN | 107509121 A | 12/2017 |
| EP | 3197198 A1 | 7/2017 |
| EP | 3461088 A1 | 3/2019 |
| JP | 2017076892 A | 4/2017 |
| JP | 2017192001 A | 10/2017 |
| KR | 20120054092 A | 5/2012 |
| KR | 20130078074 A | 7/2013 |
| WO | 2010104432 A1 | 9/2010 |
| WO | 2012159376 A1 | 11/2012 |
| WO | 2014066975 A1 | 5/2014 |
| WO | 2016014739 A1 | 1/2016 |
| WO | 2016194478 A1 | 12/2016 |
| WO | 2017094847 A1 | 6/2017 |
| WO | 2017107670 A1 | 6/2017 |
| WO | 2017215468 A1 | 12/2017 |
| WO | 2017215583 A1 | 12/2017 |

OTHER PUBLICATIONS

Wubin Pan et al, "Towards QoE assessment of encrypted YouTube adaptive video streaming in mobile networks", Published in: 2016 IEEE/ACM 24th International Symposium on Quality of Service (IWQoS), Date Added to IEEE Xplore: Oct. 18, 2016, total 6 pages. XP32978843.

Florian Wamser et al, "YoMoApp: a Tool for Analyzing QoE of YouTube HTTP Adaptive Streaming in Mobile Networks", 2015 European Conference on Networks and Communications (EuCNC), published Jun. 29, 2015, total 6 pages. XP33192769.

* cited by examiner

DATA PROCESSING METHOD, SERVER, AND DATA COLLECTION DEVICE

CROSS-REFERENCE TO RELATED APPLICATIONS

This application is a continuation of International Application No. PCT/CN2018/124142, filed on Dec. 27, 2018, which claims priority to Chinese Patent Application No. 201810136559.5, filed on Feb. 9, 2018. The disclosures of the aforementioned applications are hereby incorporated by reference in their entireties.

TECHNICAL FIELD

This application relates to the field of communications technologies, and in particular, to a data processing method, a server, and a data collection device.

BACKGROUND

To study how to provide a user with higher-quality services, a user-centered quality of experience (QoE) evaluation indicator is proposed for network services. QoE is a service evaluation standard in which a service is evaluated from the perspective of subjective perception of the user. The QoE includes video QoE. Continuous development of video services leads to an increasingly high requirement of user video quality of experience. Therefore, to accurately identify a network operations status and further guide a network operation policy or optimize a network device, it is important to obtain accurate video QoE. How to effectively obtain video QoE has become a research focus in the field of network management.

Currently, a video surveillance center server obtains video QoE by using a probe embedded in a user-side set-top box (STB). The probe detects performance data of the STB and a video stalling duration ratio of a video service stream. The STB calculates video QoE of the video service stream based on a specific algorithm, the performance data of the STB, and the video stalling duration ratio of the video service stream, and then reports the video QoE to the video surveillance center server.

However, the probe that is embedded in the STB continuously detects video stalling duration ratios of video service streams, and the STB calculates video QoE of the video service streams based on the performance data of the STB and the video stalling duration ratios of the video service streams, and then reports the video QoE to the video surveillance center server. This significantly increases the processing load on the STB. Consequently, the performance of the STB is affected.

SUMMARY

Embodiments of this application provide a data processing method, a server, and a data collection device, so that the server calculates first video QoE of a first video service stream based on first network key performance indicator (KPI) data and performance data of a first STB, thereby reducing load of the STB.

A first aspect of the embodiments of this application provides a data processing method, including the following:

In a transmission control protocol (TCP) network, a user-side STB requests a video service, and an internet protocol television server (IPTV Server) sends a first video service stream, where the first video service stream passes through network devices deployed at all layers in the TCP network. In this case, data collection devices deployed on or deployed in a bypass mode on the network devices may collect first network KPI data of the first video service stream, and the data collection devices sends the first network KPI data to a server, and the server may obtain the first network KPI data of the first video service stream. After obtaining the first network KPI data, the server may determine, based on the first network KPI data, a first STB that receives the first video service stream. Then, the server may obtain performance data of the first STB. After obtaining the first network KPI data of the first video service stream and the performance data of the first STB that receives the first video service stream, the server may input the data into an associated model for calculation, to obtain video QoE of the first video service stream. The associated model is a model obtained through training based on historical data, and the associated model is used by the server to calculate video QoE based on network KPI data and performance data of an STB.

In this embodiment of this application, the server obtains the first network KPI data of the first video service stream and the performance data of the first STB that receives the first video service stream, and then calculates the video QoE of the first video service stream based on the associated model, the first network KPI data, and the performance data of the first STB. In this way, the STB is no longer used to collect a video stalling duration ratio, and no longer calculate the video QoE based on the video stalling duration ratio, thereby greatly reducing load of the STB. In addition, it is unnecessary to embed probes in all user-side STBs. Therefore, a deployment scale is reduced, and costs of the user-side STBs are reduced.

In a possible implementation, before the server calculates the first video QoE of the first video service stream based on the associated model, the first network KPI data, and the performance data of the first STB, the method may further include: in the TCP network, when there are a plurality of STBs requesting video services, the IPTV server sends a plurality of video service streams. In this case, the data collection devices may collect historical network KPI data of the plurality of video service streams. The STBs that receive the plurality of video service streams calculate video QoE of the plurality of video service streams based on real-time information of the plurality of video service streams and send the video QoE to the server; and the server may obtain the historical network KPI data of the plurality of video service streams and historical video QoE of the plurality of video service streams. Then, the server may determine performance data of the STBs that receive the plurality of video service streams, and the server establishes the associated model based on the historical network KPI data of the plurality of video service streams, the historical video QoE of the plurality of video service streams, and the performance data of the STBs that receive the plurality of video service streams.

In this embodiment of this application, the server establishes the associated model based on the obtained historical network KPI data of the plurality of video service streams, the obtained video QoE of the plurality of video service streams, and the obtained performance data of the STBs that receive the plurality of video service streams. A specific method for establishing the associated model is provided. Therefore, in actual application, feasibility of the solution is improved.

In another possible implementation, the historical performance data may include initial buffer sizes of the STBs that receive the plurality of video service streams, and the historical network KPI data may include video packet loss rates (PLR) of the plurality of video service streams, round trip times (RTT) of the plurality of video service streams, and video bit rates of the plurality of video service streams.

In this embodiment of this application, the historical performance data may include the initial buffer sizes of the STBs that receive the plurality of video service streams, and the historical network KPI data may include the video PLRs of the plurality of video service streams, the RTTs of the plurality of video service streams, and the video bit rates of the plurality of video service streams. In actual application, feasibility of the solution is improved.

In another possible implementation, the performance data of the first STB may include an initial buffer size of the first STB, and the first network KPI data may include a video PLR of the first video service stream, an RTT of the first video service stream, and a video bit rate of the first video service.

In this embodiment of this application, the performance data of the first STB may include the initial buffer size of the first STB, and the first network KPI data may include the video PLR of the first video service stream, the RTT of the first video service stream, and the video bit rate of the first video service. In actual application, feasibility of the solution is improved.

A second aspect of the embodiments of this application provides a data processing method, including the following:

In a TCP network, a user-side STB requests a video service, and an IPTV server sends a target service stream, where in a transmission process, the target service stream passes through network devices deployed at all layers in the TCP network. In this case, data collection devices deployed on or deployed in a bypass mode on the network devices may detect a type of the target service stream, and then the server determines a target calculation rule corresponding to the service type of the target service stream, and calculates a video bit rate of the target service stream according to the target calculation rule.

In this embodiment of this application, the data collection device detects the type of the target service stream, and then determines the target calculation rule corresponding to the service type. Then, the server calculates the video bit rate of the target service stream according to the target calculation rule. A specific method for calculating the video bit rate of the target service stream is provided. Therefore, feasibility of the solution is improved. According to the method provided in this application, when the video bit rate is calculated, a packet of the target service stream does not need to be parsed. Therefore, the method in this application is applicable to calculation of a video bit rate of an encrypted target service stream.

In a possible implementation, the type of the target service stream may be a single stream of a video stream and an audio stream, and the target calculation rule may be a first preset calculation rule.

In this embodiment of this application, the type of the target service stream may be the single stream of the video stream and the audio stream, and the target calculation rule may be the first preset calculation rule. In actual application, feasibility of the solution is improved.

In another possible implementation, the first preset rule may include: the data collection device obtains accumulated download duration of the target service stream and an accumulated download amount of the target service stream, and then the data collection device may calculate the video bit rate of the target service stream based on the accumulated download duration and the accumulated download amount.

In this embodiment of this application, the data collection device calculates the video bit rate of the target service stream based on the accumulated download amount of the target service stream and the accumulated download duration of the target service stream. A specific method for calculating the video bit rate of the target service stream of a single stream type is provided. In actual application, feasibility and integrity of the solution are improved.

In another possible implementation, the type of the target service stream may be dual streams of a video stream and an audio stream that are separate from each other, and the target calculation rule is a second preset rule.

In this embodiment of this application, the type of the target service stream may be the dual streams of the video stream and the audio stream that are separate from each other, and the target calculation rule may be the second preset rule. In actual application, feasibility of the solution is improved.

In another possible implementation, the second preset rule may include: first, the data collection device may determine that the video stream in the target service stream and the audio stream in the target service stream are service streams of a same service, then the data collection device may determine an audio bit rate of the audio stream, and finally, the data collection device can calculate a video bit rate of the video stream based on the calculated audio bit rate.

In this embodiment of this application, the data collection device may calculate the video bit rate of the video stream based on the audio bit rate of the audio stream. In actual application, a specific method for calculating the video bit rate of the target service stream of a dual stream type is provided. Therefore, feasibility and integrity of the solution are improved.

In another possible implementation, that the data collection device determines an audio bit rate of the audio stream may be: the data collection device may calculate the audio bit rate of the audio stream based on download duration of audio data of the audio stream in a single audio fragment and a download amount of the audio data of the audio stream in the single audio fragment that are obtained by the data collection device.

In this embodiment of this application, the data collection device may calculate the audio bit rate of the audio stream based on the download duration of the audio data of the audio stream in the single audio fragment and the download amount of the audio data of the audio stream in the single audio fragment. Therefore, a specific method for calculating the audio bit rate of the audio stream is provided. In actual application, feasibility of the solution is improved.

In another possible implementation, that the data collection device calculates a video bit rate of the target service stream based on the audio bit rate may be: the data collection device may first calculate accumulated download duration of the audio stream based on the audio bit rate of the audio stream and an obtained accumulated download amount of the audio stream in preset duration, and then the data collection device may calculate the video bit rate of the video stream based on the calculated accumulated download duration of the audio stream and an accumulated download amount of the video stream in the preset duration.

In this embodiment of this application, the data collection device may calculate the video bit rate of the video stream based on the accumulated download duration of the audio stream and the accumulated download amount of the video stream. Therefore, a specific method for calculating the video bit rate of the video stream is provided. In actual application, feasibility of the solution is improved.

In another possible implementation, before the data collection device detects the type of the target service stream, the method may further include: the data collection device may determine that the target service stream is an encrypted stream.

In this embodiment of this application, the data collection device may determine that the target service stream is the encrypted stream. Therefore, before the method for calculating the video bit rate of the video stream provided in this application is used, the data collection device may first determine that the target service stream is the encrypted stream. If the target service stream is the encrypted stream, the data collection device may calculate the video bit rate of the target service stream by using the method for calculating the video bit rate provided in this application. If the target service stream is an unencrypted stream, the data collection device may preferentially obtain the video bit rate of the target service stream in a deep packet inspection (DPI) manner. Certainly, the method for calculating the video bit rate provided in this application may also be used. Therefore, in actual application, perfection of the solution is improved.

In another possible implementation, that the data collection device detects a type of the target service stream may include: the data collection device first detects a quantity of data packets of the target service stream that are transmitted in a unit time; and if the quantity of data packets of the target service stream that are transmitted in the unit time is less than a preset value, the data collection device may determine that the target service stream is the single stream of the mixture of the video stream and the audio stream; or if the quantity of data packets of the target service stream that are transmitted in the unit time is greater than the preset value, the data collection device may determine that the target service stream is the dual streams of the video stream and the audio stream that are separate from each other.

In this embodiment of this application, the data collection device may determine the type of the target service stream based on the quantity of data packets of the target service stream that are transmitted in the unit time. In actual application, a specific method for determining the type of the target service stream is provided. Therefore, feasibility of the solution is improved.

A third aspect of the embodiments of this application provides a server. The server has a function of implementing behavior of the server in the first aspect. The function may be implemented by hardware, or may be implemented by hardware executing corresponding software. The hardware or the software includes one or more modules corresponding to the function.

A fourth aspect of the embodiments of this application provides a data collection device. The data collection device has a function of implementing behavior of the data collection device in the second aspect. The function may be implemented by hardware, or may be implemented by hardware executing corresponding software. The hardware or the software includes one or more modules corresponding to the function.

A fifth aspect of the embodiments of this application provides a server. The server includes a processor, a memory, an input/output device, and a bus. The processor, the memory, and the input/output device are separately connected to the bus. The memory stores a computer instruction. The processor executes the computer instruction in the memory, to implement any implementation of the first aspect.

A sixth aspect of the embodiments of this application provides a data collection device. The data collection device includes a processor, a memory, an input/output device, and a bus. The processor, the memory, and the input/output device are separately connected to the bus. The memory stores a computer instruction. The processor executes the computer instruction in the memory, to implement any implementation of the second aspect.

A seventh aspect of the embodiments of this application provides a chip system. The chip system includes a processor, configured to support a network device in implementing a function described in the first aspect, for example, sending or processing data and/or information in the foregoing method. In a possible design, the chip system further includes a memory. The memory is configured to store a program instruction and data that are necessary for the network device. The chip system may include a chip, or may include a chip and another discrete device.

An eighth aspect of the embodiments of this application provides a chip system. The chip system includes a processor, configured to support a network device in implementing a function described in the second aspect, for example, sending or processing data and/or information in the foregoing method. In a possible design, the chip system further includes a memory. The memory is configured to store a program instruction and data that are necessary for the network device. The chip system may include a chip, or may include a chip and another discrete device.

A ninth aspect of the embodiments of this application provides a computer program product including an instruction. When the computer program product is run on a computer, the computer is enabled to perform any implementation in the first aspect or the second aspect.

A tenth aspect of the embodiments of this application provides a computer readable storage medium including an instruction. When the instruction is run on a computer, the computer is enabled to perform any implementation in the first aspect or the second aspect.

DESCRIPTION OF EMBODIMENTS

An embodiment of this application provides a data processing method, so that the server calculates first video QoE of a first video service stream based on first network KPI data and performance data of a first STB, thereby reducing load of the STB.

Figure 1:
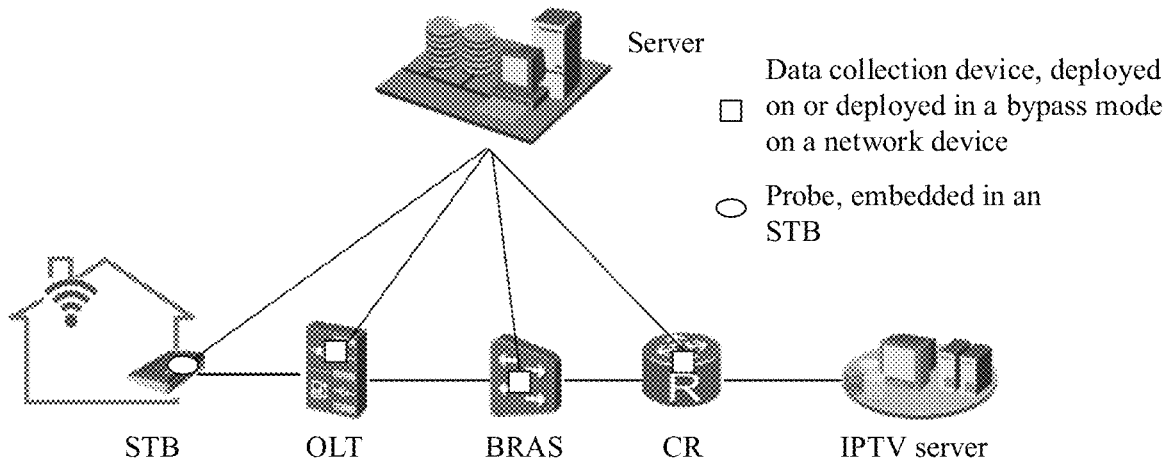
FIG. 1 is a system framework diagram of a data processing method according to an embodiment of this application.

Referring to FIG. 1, in a transmission process in a TCP network, a video service stream passes through network devices at all layers in the TCP network. For example, an IPTV server sends the video service stream, and the video service stream passes through a core router (CR), a broadband remote access server (BRAS), and an optical line terminal (OLT) in FIG. 1. Then, a user-side STB receives the video service stream. After processing the video service stream, the STB may play the video. Therefore, it can be learned that in the TCP network, the transmitted video service stream passes through the network devices deployed at all layers. Network KPI data of the video service stream may be collected based on the video service stream that passes through the network devices deployed at all layers. The network KPI data includes features of the video service stream, such as a packet loss rate (PLR) of the video service stream, a round trip time (RTT) of the video service stream, a video bit rate of the video service stream, and may further include features such as a load ratio of a device. Link performance of an end-to-end topology in which the device is located greatly depends on the network KPI data. Once the link performance is poor, abnormal playing of the video easily occurs on a user-side device. Consequently video QoE is affected. In view of this, this application proposes a solution in which a collection device deployed in single-node mode any one of the network devices deployed at all the layers in the TCP network or collection devices are deployed in a multi-node mode or a bypass mode on the network devices. The data collection device is configured to collect the network KPI data of the video service stream. In this application, probes are embedded in a few different types of user-side STBs. Video real-time information and performance data of the STBs are obtained by using the probes, and video QoE is calculated. Then, the video QoE and the performance data of the STBs are sent to a server. The server may establish an associated model of the video QoE based on the network KPI data, the video QoE, and the like. The server is configured to: obtain the data, analyze and process the data, and after establishing the associated model of the video QoE, obtain the network KPI data and the performance data of the STBs, to calculate the video QoE. In this application, the server may be a video surveillance center server having a function of calculating video QoE, or may be an independent server having a function of calculating video QoE. This is not specifically limited herein. In the TCP network, when the video service stream is transmitted, the server obtains the network KPI data that is of the video service stream transmitted by the network devices and that is collected by the data collection devices deployed on or deployed in a bypass mode on the network devices (for example, the BRAS or the OLT).

Figure 2:
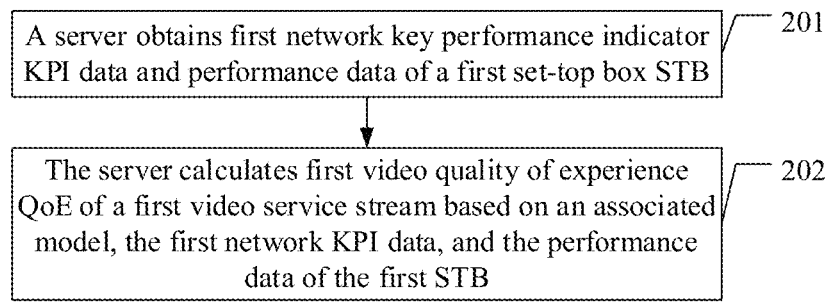
FIG. 2 is a schematic diagram of an embodiment of a data processing method according to an embodiment of this application.

The following describes a data processing method in an embodiment of this application from a perspective of a server. Referring to FIG. 2, an embodiment of the data processing method in this embodiment of this application includes the following steps.

201. The server obtains first network key performance indicator KPI data and performance data of a first set-top box STB.

In a TCP network, a user-side STB requests a video service, and an IPTV server sends a first video service stream, where the first video service stream passes through network devices deployed at all layers in the TCP network. In this case, data collection devices deployed on the network devices may collect the first network KPI data of the first video service stream, the data collection device may send the collected first network KPI data of the first video service stream to the server, and the server may obtain the first network KPI data. After obtaining the first network KPI data, the server may determine, based on a destination interne protocol (IP) address or a destination port number that is of the first video service stream and that is carried in the first network KPI data, the first STB that receives the first video service stream. Then, the server may obtain the performance data of the first STB. The first video service stream is associated with the first STB, in other words, the first STB is an STB that receives the first video service stream. The performance data of the first STB includes an initial buffer size of the first STB. Optionally, the performance data of the first STB may further include a clock rate of a central processing unit (CPU) of the first STB.

It should be noted that when the server is a video surveillance center server, the server may obtain the performance data of the first STB from a message that is sent by the first STB to the server for requesting the video service by the first STB, or obtain the performance data of the first STB from a local database for storing performance data of different types of STBs. When the server is an independent server having a function of calculating video QoE, the server may obtain the performance data of the first STB from a video surveillance center or obtain the performance data of the first STB from a local database for storing performance data of different types of STBs. This is not specifically limited herein.

202. The server calculates first video quality of experience QoE of the first video service stream based on an associated model, the first network KPI data, and the performance data of the first STB.

After obtaining the first network KPI data of the first video service stream and the performance data of the first STB, the server inputs the first network KPI data and the performance data of the first STB into the associated model for calculation, to obtain the first video QoE of the first video service stream. The associated model is a model obtained through training based on historical data, and the associated model is used by the server to calculate video QoE based on network KPI data and performance data of an STB.

It should be noted that the associated model may be the model obtained by the server through training based on the historical data, or may be a model obtained by another terminal or another server through training based on the historical data. This is not specifically limited herein.

In this embodiment of this application, the server obtains the first network KPI data and the performance data of the first STB, where the first network KPI data is network KPI data of the first video service stream, and the first video service stream is associated with the first STB. Then, the server calculates the first video QoE of the first video service stream based on the associated model, the first network KPI data, and the performance data of the first STB. The associated model is the model obtained through training based on the historical data, and the associated model is used by the server to calculate the video QoE based on the network KPI data and the performance data of the STB. Therefore, the server obtains the first network KPI data and the performance data of the first STB, and may calculate the video QoE of the first video service stream based on the associated model, the first network KPI data, and the performance data of the first STB. In this way, the STB is no longer used to collect a video stalling duration ratio, and no longer calculate the video QoE based on the video stalling duration ratio, thereby greatly reducing load of the STB.

Figure 3:
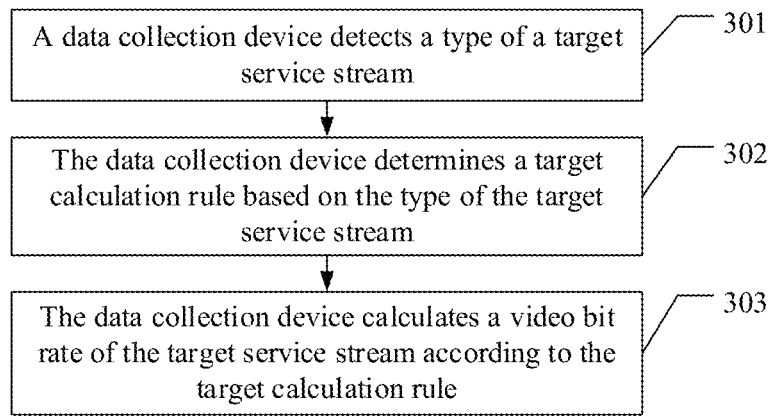
FIG. 3 is a schematic diagram of another embodiment of a data processing method according to an embodiment of this application.

The foregoing describes the data processing method in the embodiment of this application from the perspective of the server. The following describes a data processing method in an embodiment of this application from a perspective of a data collection device. Referring to FIG. 3, another embodiment of the data processing method in this embodiment of this application includes the following steps.

301. The data collection device detects a type of a target service stream.

In a TCP network, a user-side STB requests a video service, and an IPTV server sends the target service stream to the user-side STB. When the target service stream is transmitted and passes through network devices deployed at all layers, a collection device deployed on or deployed in a bypass mode on any one of the network devices may detect the type of the target service stream. Specifically, the data collection device may detect a quantity of data packets of the target service stream that are transmitted in a unit time, and determine the type of the target service stream based on the quantity of the data packets of the target service stream that are transmitted in the unit time. Alternatively, the data collection device may determine the type of the target service stream by using a triplet of the target service stream. This is not specifically limited herein.

It should be noted that the target service stream may be an encrypted stream, or may be an unencrypted stream. This is not specifically limited herein.

302. The data collection device determines a target calculation rule based on the type of the target service stream.

After the data collection device detects the type of the target service stream and determines the type of the target service stream, the data collection device may determine the corresponding target calculation rule based on the type of the target service stream. For example, if the data collection device determines, through detection, that the type of the target service stream is a single stream of a mixture of a video stream and an audio stream, the data collection device may determine that the target calculation rule corresponding to a single stream type is a first preset calculation rule. It should be noted that the target service stream is the single stream, and the target calculation rule may be the first preset calculation rule, or may be another calculation rule. This is not specifically limited herein. For example, if the data collection device determines that the type of the target service stream is dual streams of a video stream and an audio stream that are separate from each other, the data collection device may determine that the target calculation rule corresponding to a dual stream type is a second preset calculation rule. It should be noted that the target service stream is the dual streams, and the target calculation rule may be the second preset calculation rule, or may be another calculation rule. This is not specifically limited herein.

303. The data collection device calculates a video bit rate of the target service stream according to the target calculation rule.

After determining the type of the target service stream, the data collection device determines the target calculation rule corresponding to the type of the target service stream. Then, the data collection device calculates the video bit rate of the target service stream according to the target calculation rule. For example, in step 302, if the data collection device determines that the target calculation rule corresponding to the single stream type is the first preset calculation rule, the data collection device may calculate the video bit rate of the target service stream according to the first preset calculation rule. Therefore, in this application, the data collection device determines the target calculation rule based on the service type of the target service stream, and then the data collection device calculates the video bit rate of the target service stream according to the target calculation rule, and does not need to parse a packet of the target service stream. Therefore, the solution that is provided in this application and in which the data collection device calculates the video bit rate of the target service stream is applicable to calculation of a video bit rate of an encrypted stream in an encrypted scenario.

In this embodiment of this application, the data collection device detects the type of the target service stream, the data collection device determines the target calculation rule based on the type of the target service stream, and the data collection device may calculate the video bit rate of the target service stream according to the target calculation rule. Therefore, the type of the target service stream is detected, then the target calculation rule corresponding to the type of the target service stream is determined, and the video bit rate of the target service stream is calculated according to the target calculation rule. In this way, the video bit rate of the video service stream is collected, and the data collection device can provide a server with network KPI data of the video service stream, including the video bit rate of the video service stream.

In this embodiment of this application, the server calculates the video QoE of the first video service stream based on the associated model, the first network KPI data, and the first performance data of the first STB. The associated model may be a model obtained by the server through training based on historical data. Detailed descriptions are provided below in an embodiment in FIG. 4.

Figure 4:
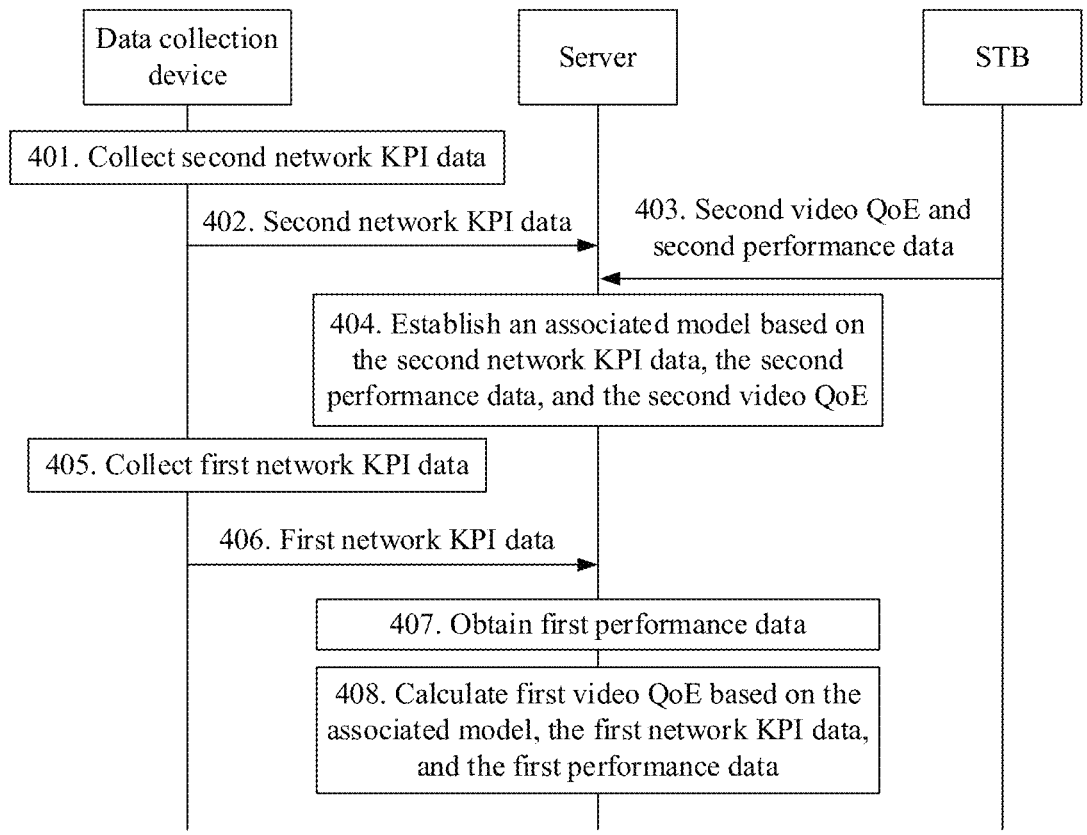
FIG. 4 is a schematic diagram of another embodiment of a data processing method according to an embodiment of this application.

Referring to FIG. 4, in the embodiment in FIG. 4, a server obtains second network KPI data, second video QoE, and second performance data to establish an associated model. Another embodiment of a data processing method in this embodiment of this application includes the following steps.

401. A data collection device collects the second network KPI data.

In a TCP network, when a video service stream is transmitted, the video service stream passes through network devices deployed at all layers. The data collection device is deployed in a single-node mode or a bypass mode on any one of the network devices. The network devices deployed at all the layers divert the video service stream to the data collection device, or replicate the video service stream in a mirroring manner and then send the video service stream to the data collection device. Then, the data collection device may analyze the video service stream, to extract network KPI data of the video service stream. The second network KPI data includes a plurality of groups of network KPI data of a plurality of video service streams, and the plurality of video service streams are used as data that is collected at an early stage for establishing the associated model by the server, subsequently used by the server to analyze an association relationship between network KPI data and video QoE.

Figure 5:
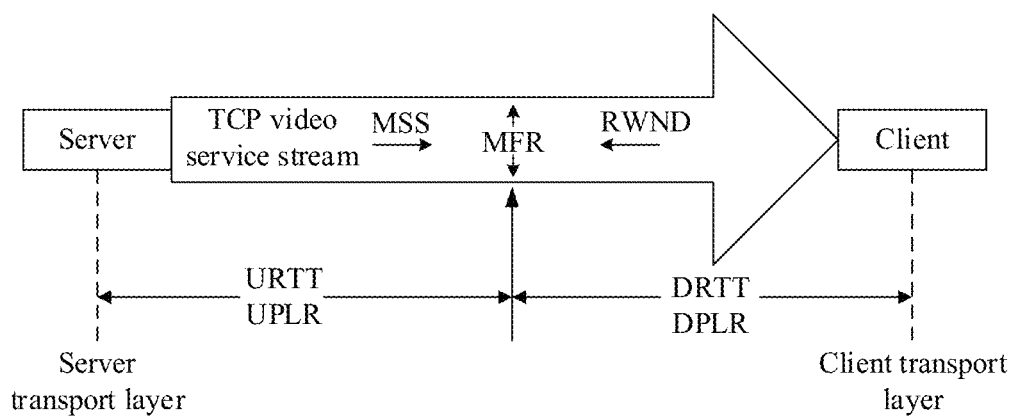
FIG. 5 is a schematic diagram of a scenario of a data processing method according to an embodiment of this application.

Specifically, the data collection device may collect the network KPI data once based on preset duration. For example, the data collection device collects the network KPI data once every five minutes. Specifically, after the network devices at all the layers in the TCP network perform a diversion or mirroring operation on the video service stream, the data collection device may determine a corresponding calculation rule based on a type of the service stream, and then calculate a video bit rate of the service stream according to the calculation rule. In addition, when the video service stream is an unencrypted stream, the data collection device may further read a real-time bit rate of the video service stream from a field of a packet in a DPI manner. The data collection device determines a round trip time RTT of the video service stream based on a timestamp of the packet of the video service stream. In the TCP network, the video service stream is transmitted in a form of a packet, and each packet has a corresponding sequence number. Therefore, the data collection device can obtain a packet loss rate on a current node based on the sequence number of the packet, and the data collection device can obtain data such as a maximum segment size (MSS) of the packet by parsing the packet. Referring to FIG. 5, a server is the server, a client is a client, and the data collection device may collect network KPI data of a video service stream in an upstream network and network KPI data of the video service stream in a downstream network. It can be learned from FIG. 5 that, the data collection device may obtain an upstream packet loss rate (UPLR) of the video service stream in the upstream network, an upstream round trip time (URTT), and a real-time video bit rate of the video service stream in the upstream network. Then, the data collection device may obtain data such as a downstream packet loss rate (DPLR) in the downstream network, a downstream round trip time (DRTT), and a real-time bit rate of the video service stream in the downstream network. For details, refer to Table 1.

streams, and then sends the plurality of groups of network KPI data of the plurality of video service streams to the server.

402. The data collection device sends the second network KPI data to the server.

After obtaining the second network KPI data, the data collection device sends the second network KPI data to the server, where the second network KPI data includes the plurality of groups of network KPI data of the plurality of video service streams, and the plurality of video service streams are subsequently used by the server to analyze a relationship between the second video QoE and the second network KPI data and establish the associated model.

403. The server receives the second video QoE and the second performance data that are sent by STBs.

In the TCP network, after the video service stream is transmitted to the user-side STB, the STB plays the video service. In this application, the server needs to collect video QoE of a plurality of video service streams at an early stage to establish the associated model. Therefore, first, a plurality of types of STBs are deployed, probes are embedded in the plurality of types of STBs, and the probes detect real-time video information and performance data of the STBs; then, the STBs calculate the video QoE of the video service streams based on the video real-time information and the performance data of the STBs, and report the video QoE and the performance data of the STBs to the server; and the server may receive the second video QoE and the second performance data. The second video QoE includes the video QoE of the plurality of video service streams, and the second performance data includes initial buffer information of the plurality of different types of STBs, as shown in Table 2.

TABLE 2

| Account | STB | Timestamp | Video ID | QoE |
|---|---|---|---|---|
| 151916877458 | Huawei-XXX | 2017 Jan. 3 20:00:00 | 2777429071 | 3.3/5.0 |
| 151916877458 | Huawei-XXX | 2017 Jan. 4 20:00:30 | 2777429071 | 3.9/5.0 |
| 151916877458 | Huawei-XXX | 2017 Jan. 5 20:01:00 | 2777429071 | 3.7/5.0 |
| 151916877458 | Huawei-XXX | 2017 Jan. 6 20:01:30 | 2777429071 | 4.0/5.0 |
| 151916877458 | Huawei-XXX | 2017 Jan. 7 20:20:00 | 2777429071 | 3.5/5.0 |

Table 2 shows video QoE calculated by STBs with a type of Huawei-xxx based on video service streams at different time. Table 2 includes an account, an STB, a timestamp,

TABLE 1

| Account | Timestamp | Video ID | Download Octets/ Byte | Download Time/sec | Rate/ Kbps | Rtt/ms | Plr |
|---|---|---|---|---|---|---|---|
| 151916877458 | 2017 Jan. 3 20:00:00 | 2777429071 | 400400 | 2.434 | 1260 | 12.154 | 0.53% |
| 151916877458 | 2017 Jan. 4 20:00:30 | 2777429071 | 379400 | 2.291 | 1350 | 17.898 | 0.00% |
| 151916877458 | 2017 Jan. 5 20:01:00 | 2777429071 | 378000 | 2.301 | 1400 | 13.413 | 0.00% |
| 151916877458 | 2017 Jan. 6 20:01:30 | 2777429071 | 394800 | 2.358 | 1275 | 15.504 | 1.86% |
| 151916877458 | 2017 Jan. 7 20:20:00 | 2777429071 | 364000 | 2.278 | 1250 | 9.993 | 0.00% |

Table 1 shows a plurality of groups of network KPI data of the video service stream that are collected by the data collection device based on preset duration, and each group of network KPI data includes an account (Account) of the video service stream, a timestamp (timestamp), a video source information (VideoID), an accumulated download amount (DownloadQctets), download duration (Download-Time), a bit rate (Rate), an RTT, and a PLR of the video service stream. The data collection device collects a plurality of groups of network KPI data of a plurality of video service video source information, and video QoE. In this application, a particular quantity of STBs with embedded probes are deployed before the server establishes the associated model. The STBs have different types and are configured to subsequently collect video QoE of video service streams sent by the different types of STBs. Therefore, in this application, after the server calculates the video QoE of the video service stream based on the associated model, the network KPI data, and the performance data of the STB, and the server establishes the associated model, the STB is no longer used to calculate the video QoE, thereby reducing load of the STB. In addition, it is unnecessary to embed probes in all user-side STBs. Therefore, a deployment scale is reduced, and costs of the user-side STBs are reduced.

It should be noted that after the server receives performance data sent by the STBs, the server integrates the performance data reported by the different types of STBs, to generate an initial buffer information table. Table 3 is an initial buffer information table corresponding to different types of STBs, and is stored in the server. Table 3 includes types (Type) and initial buffer (initBuf) sizes of the STBs.

TABLE 3

| Type | InitBuf |
|---|---|
| Huawei-XXX | 15 MB |
| MI-XXX | 10 MB |
| Skyworth-XXX | 12 MB |
| Letv-XXX | 12 MB |
| Tmall magic box-XXX | 10 MB |

404. The server establishes the associated model based on the second network KPI data, the second performance data, and the second video QoE.

Figure 6:
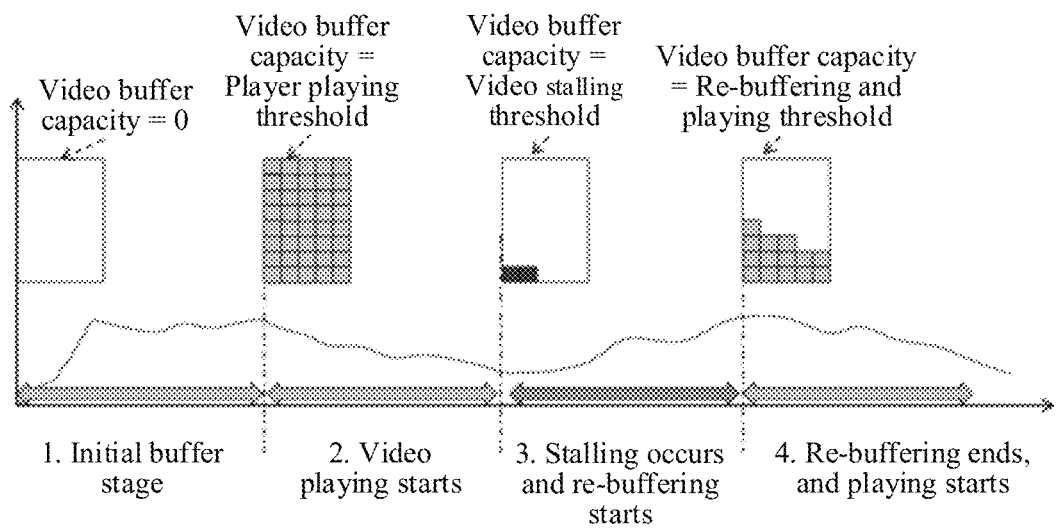
FIG. 6 is a schematic diagram of another scenario of a data processing method according to an embodiment of this application.

The video QoE is mainly determined based on a stalling status of the video service played by the STB, and the stalling status of the played video service is represented by a video stalling duration ratio. The video stalling duration ratio is a ratio of video stalling duration to video playing duration. However, stalling that occurs when the STB plays the video service is usually caused because buffered data for a player in the STB is used up. FIG. 6 is a schematic diagram of principles of occurrence of stalling when an STB plays a video service and elimination of the video service stalling. When the buffered data in the STB is used up, if the STB plays the video service, stalling occurs. Therefore, the video QoE is related to a real-time buffered data amount for the player in the STB that plays the video service. The real-time buffered data amount in the STB is determined based on an initial buffer size and an amount of used buffered data in the STB. The amount of used buffered data in the STB is determined based on a difference between a use requirement of playing the video service and download performance of a current network. The use requirement of playing the video service is represented by a video bit rate of the video service stream. The download performance of the current network is measured based on network throughput performance of a TCP bearer network. For example, Formula 1.1 is a formula for calculating a network throughput. It can be learned that, in the TCP bearer network, the amount of used buffered data in the STB is affected by the video bit rate of the video service stream and the network throughput. If the network throughput is less than the video bit rate of the video service stream, to support continuous video playing, the STB uses the buffered video data for the player. If the network throughput keeps being less than the video bit rate of the video service stream, the buffered data in the STB may be used quickly. Consequently, the buffered data in the STB is used up, and stalling occurs when the video service is played. In addition, because the STB has a fixed initial buffer size, to store a part of video content that is not played, the initial buffer size affects a use speed of the buffered data in the STB.

$$Throughput(t) = \frac{1.22 MSS}{RTT\sqrt{PLR}} \quad (1.1)$$

In Formula (1.1), Throughput (t) is the network throughput, MSS is the maximum segment size of the packet for transmitting the video service stream, RTT is the round trip time of the video service stream, and PLR is the packet loss rate of the video service stream. It can be learned from Formula (1.1) that, in the TCP network, the network throughput is jointly determined based on the RTT in the network KPI data of the video service stream, the PLR in the network KPI data of the video service stream, and the MSS in the network KPI data of the video service stream, where the MSS is usually a fixed value. Therefore, the network throughput rate is jointly determined based on the RTT in the network KPI data and the PLR in the network KPI data. Therefore, video QoE of each video service stream in the second video QoE is correspondingly related to a PLR of the video service stream, an RTT of the video service stream, and the video bit rate of the video service stream that are in the second network KPI data and an initial buffer size of an STB that receives the video service stream.

Therefore, in the TCP network, the video QoE is related to the initial buffer size of the STB, the PLR of the video service stream, the RTT of the video service stream, and the video bit rate of the video service stream. The network KPI data includes the PLR of the video service stream, the RTT of the video service stream, and the video bit rate of the video service stream. Therefore, the data related to the video QoE can be obtained based on the network KPI data sent by the data collection device. Therefore, input parameters of the associated model are PLRs of the plurality of video service streams, RTTs of the plurality of video service streams, video bit rates of the plurality of video service streams that are in the second network KPI data and the second performance data, and the second performance data includes initial buffer information of the plurality of STBs. In this case, the associated model of the video QoE is expressed as Formula (1.2):

$$QoE(t) = F(Buffer_{init}, Rate(t), Rtt(t), Plr(t)) \quad (1.2)$$

In Formula (1.2), QoE is the video quality of experience of the video service stream, $Buffer_{init}$ is the initial buffer size of the STB, Rate(t) is the video bit rate of the video service stream, RTT(t) is the round trip time of the video service stream, Plr(t) is the packet loss rate of the video service stream, F(t) is a function for calculating the QoE, and t is a time for sampling network KPI data of the video service stream.

The server integrates the obtained second network KPI data, second performance data, and second video QoE data to generate a dataset. Then, the server establishes the associated model based on the generated dataset, where the associated model is an associated model between the second video QoE and the second network KPI data. Specifically, the server associates the network KPI data in Table 1 and the video QoE data in Table 2 based on an account, a timestamp, and video source information, and generates the dataset by mapping a type of an STB corresponding to the video QoE in Table 2, onto Table 3 that is stored in the server and that shows initial buffer information of the different types of STBs. For example, data in Table 1 and Table 2 is integrated based on a timestamp corresponding to an account "151916877458" and data of video source information "2777429071", and Table 4 may be obtained. Table 4 is a dataset of the associated model.

TABLE 4

| Account | STB | Timestamp | Video ID | InitBuf | Rate/Kbps | Rtt/ms | Plr | QoE |
|---|---|---|---|---|---|---|---|---|
| 151916877458 | Huawei-XXX | 2017 Jan. 3 20:00:00 | 2777429071 | 15 MB | 1260 | 12.154 | 0.53% | 3.3/5.0 |
| 151916877458 | Huawei-XXX | 2017 Jan. 4 20:00:30 | 2777429071 | 15 MB | 1350 | 17.898 | 0.00% | 3.9/5.0 |
| 151916877458 | Huawei-XXX | 2017 Jan. 5 20:01:00 | 2777429071 | 15 MB | 1400 | 13.413 | 0.00% | 3.7/5.0 |
| 151916877458 | Huawei-XXX | 2017 Jan. 6 20:01:30 | 2777429071 | 15 MB | 1275 | 15.504 | 1.86% | 4.0/5.0 |
| 151916877458 | Huawei-XXX | 2017 Jan. 7 20:20:00 | 2777429071 | 15 MB | 1250 | 9.993 | 0.00% | 3.5/5.0 |

The server establishes the associated model based on the generated dataset. For example, a process of establishing the associated model by the server is described by using a combination of exponential fitting and polynomial fitting as an example. The server establishes the associated model based on the complete associated dataset in Table 3 and the predetermined input parameters of the associated model, where it can be learned from Formula (1.2) that the input parameters are the video bit rate of the video service stream, the PLR of the video service stream, the RTT of the video service stream, and the initial buffer size of the STB, for example, Formula (1.3):

$$Qoe(t) = F(Buffer_{init}, rate(t), Rtt(t), Plr(t)) = \alpha_1 * e^{\beta_2 * f(t)} \quad (1.3)$$

where $f(t) = \lambda_1 * Rtt(t) + \lambda_2 * Plr(t) + \lambda_3 * rate(t) + \lambda_4 * Buffer_{init} + \lambda_5$.

In Formula (1.3), $\alpha 1, \alpha 2, \beta 1, \beta 2, \lambda 1, \lambda 2, \lambda 3, \lambda 4$ and $\lambda 5$ are fitting coefficients of the associated model, and f(t) is a calculation function. Based on the dataset generated by the server, a sampling time t, the packet loss rate of the video service stream, the round trip time of the video service stream, and the video bit rate of the video service stream are used as a variable, and the video QoE is used as a dependent variable, to perform fitting in a manner of combining the exponential fitting and the polynomial fitting. The fitting coefficients are obtained by using a gradient descent algorithm. For example, a group of fitting coefficients of the associated model may be manually predetermined, and then the video QoE is calculated by using the associated model. Then, the calculated video QoE is compared with actual video QoE of the video service stream, to obtain an error value, and the fitting coefficients are determined based on the error value. For example, Table 5 shows fitting coefficients obtained in this fitting manner. In other words, the fitting coefficients of the associated model are shown in Table 5.

TABLE 5

| α1 | α2 | β1 | β2 | λ1 | λ2 | λ3 | λ4 | λ5 |
|---|---|---|---|---|---|---|---|---|
| −0.741 | 1.124 | −0.147 | −0.013 | 0.005 | −0.014 | 13.471 | 0.562 | −3.251 |

405. The data collection device collects first network KPI data.

After the server establishes the associated model, in the TCP network, when a first video service stream is transmitted, the collection device may collect the first network KPI data of the first video service stream. The first network KPI data includes a PLR of the first video service stream, an RTT of the first video service stream, and a video bit rate of the first video service stream.

It should be noted that the data collection device may be deployed in a single-node mode on any one of network devices deployed at all layers in the TCP network, or data collection devices may be deployed in a multi-node mode on any one of the network devices deployed at all the layers in the TCP network. Even if a calculation or upload fault occurs on some data collection devices, other data collection devices may still provide network KPI data of the video service stream. This ensures that user-side video QoE is effectively monitored, and resolves a prior-art problem that video QoE uploaded by a user-side STB cannot be obtained and monitored by a video surveillance center server permanently once the user-side STB cannot normally calculate or upload the video QoE.

406. The data collection device sends the first network KPI data to the server.

After collecting the first network KPI data of the first video service stream, the data collection device sends the first network KPI data to the server.

407. The server obtains first performance data.

The server may obtain the performance data of a first STB that plays a video service of the first video service stream. Specifically, the server may obtain the performance data of the first STB from the table, stored in step 403, of initial buffer information of the different types of STBs, or may obtain the performance data of the first STB by using the video surveillance center server. This is not specifically limited herein.

408. The server calculates first video QoE based on the associated model, the first network KPI data, and the first performance data.

The server inputs the PLR of the first video service stream, the RTT of the first video service stream, the video bit rate of the first video service stream that are in the first network KPI data, and the performance data of the first STB into the associated model, and then calculates the first video QoE of the first video service stream by using the associated model. Therefore, when calculating the video QoE by using the associated model, the server needs to use only the network KPI data that is of the video service stream and that is collected by the data collection device and the performance data of the first STB. The user-side STB does not need to participate in a data processing process, thereby reducing load of the STB. In addition, it is unnecessary to embed probes in all user-side STBs, and only few user-side STBs provide video QoE at a stage of establishing the associated model by the server. After the model is established, the user-side video QoE can be identified quickly depending on only the network KPI data that is of the video service stream and that is collected by the data collection device.

In this embodiment of this application, a target service stream may be an encrypted stream, or may be an unencrypted stream. This is specifically limited herein. In a subsequent embodiment, when the target service stream is the encrypted stream, the data collection device determines a target calculation rule based on a type of the target service stream. Then, an example in which the data collection device calculates a video bit rate of the target service stream according to the target calculation rule is used for description.

In this embodiment of this application, the server obtains the first network KPI data and the performance data of the first STB, where the first network KPI data is network KPI data of the first video service stream, and the first video service stream is associated with the first STB. Then, the server calculates the first video QoE of the first video service stream based on the associated model, the first network KPI data, and the performance data of the first STB, where the associated model is a model obtained through training based on historical data. Therefore, the server obtains the first network KPI data and the performance data of the first STB, and may calculate the video QoE of the first video service stream based on the associated model, the first network KPI data, and the performance data of the first STB. In this way, the STB is no longer used to collect a video stalling duration ratio, and calculate the video QoE based on the performance data of the STB, thereby greatly reducing load of the STB.

In this embodiment of this application, when the target service stream is the encrypted stream, the data collection device detects the type of the target service stream. Then, the data collection device determines the target calculation rule based on the type of the target service stream, and calculates the video bit rate of the target service stream according to the target calculation rule. That the data collection device detects the type of the target service stream may be: the data collection device determines the type of the target service stream by detecting a quantity of data packets of the target service stream that are transmitted in a unit time, or the data collection device determines the type of the target service stream by detecting a triplet of the target service stream. The triplet of the target service stream includes a source IP address of the target service stream, a destination IP address of the target service stream, and a transport layer protocol for transmitting the target service stream. This is not specifically limited herein. In a subsequent embodiment, that the data collection device determines the type of the target service stream by detecting the quantity of data packets of the target service stream that are transmitted in the unit time is merely used as an example for description.

In this embodiment of this application, if the target service stream is the encrypted stream, and the target service stream is a single stream of a mixture of a video stream and an audio stream, the data collection device may determine a first preset calculation rule based on the service stream of a single stream type, and the data collection device calculates the video bit rate of the target service stream according to the first preset calculation rule. The first preset calculation rule may be that the data collection device calculates the video bit rate of the target service stream based on collected accumulated download duration of the target service stream and a collected accumulated download amount of the target service stream, or another calculation method may be used. This is not specifically limited herein. In a subsequent embodiment, that the first preset calculation rule is that the data collection device calculates the video bit rate of the target service stream based on collected accumulated download duration of the target service stream and a collected accumulated download amount of the target service stream is merely used as an example for description.

In this embodiment of this application, if the target service stream is the encrypted stream, and the target service stream is dual streams of a video stream and an audio stream that are separate from each other, the data collection device may determine a second preset calculation rule based on the service stream of a dual stream type, and the data collection device calculates the video bit rate of the target service stream according to the second preset calculation rule. The second preset calculation rule may be that the data collection device calculates the video bit rate of the target service stream based on an audio bit rate, or another calculation method may be used. This is not specifically limited herein. That the data collection device calculates the video bit rate of the target service stream based on an audio bit rate may be that the data collection device calculates accumulated download duration of the audio stream based on the audio bit rate and an accumulated download amount of the audio stream in preset duration, and then calculates the video bit rate of the target service stream based on the accumulated download duration of the audio stream and an accumulated download amount of the video stream in the preset duration, or another manner may be used to calculate the video bit rate. This is not specifically limited herein. In a subsequent embodiment, it is merely described: that the data collection device calculates the video bit rate of the target service stream based on an audio bit rate may be that the data collection device calculates accumulated download duration of the audio stream based on the audio bit rate and an accumulated download amount of the audio stream in preset duration, and then calculates the video bit rate of the target service stream based on the accumulated download duration of the audio stream and an accumulated download amount of the video stream in the preset duration.

In this embodiment of this application, when the target service stream is the dual streams of the video stream and the audio stream that are separate from each other, that the data collection device determines that the video stream and the audio stream are service streams of a same service may be that the data collection device determines, based on the triplet of the target service stream and a timestamp of the target service stream, that the video stream and the audio stream are service streams of the same service, or another manner may be used for the determining. This is not specifically limited herein. In a subsequent embodiment, that the data collection device determines, based on the triplet of the target service stream and a timestamp of the target service stream, that the video stream and the audio stream are service streams of the same service is merely used as an example for description.

In this embodiment of this application, when the target service stream is the dual streams of the video stream and the audio stream that are separate from each other, that the data collection device determines the audio bit rate of the audio stream may be that the data collection device calculates the audio bit rate of the audio stream based on download duration of audio data of the audio stream in a single audio fragment and a download amount of the audio data of the audio stream in the single audio fragment, or another manner may be used to calculate the audio bit rate. This is not specifically limited herein. In a subsequent embodiment, that the data collection device calculates the audio bit rate of the audio stream based on download duration of the audio data of the audio stream in a single audio fragment and a download amount of the audio data of the audio stream in the single audio fragment is merely used as an example for description.

In this embodiment of this application, after determining that the target service stream is the encrypted stream, the data collection device may determine, by determining the type of the target service stream, the calculation rule for calculating the video bit rate of the target service stream. The following provides detailed descriptions by using an embodiment in FIG. 7.

Figure 7:
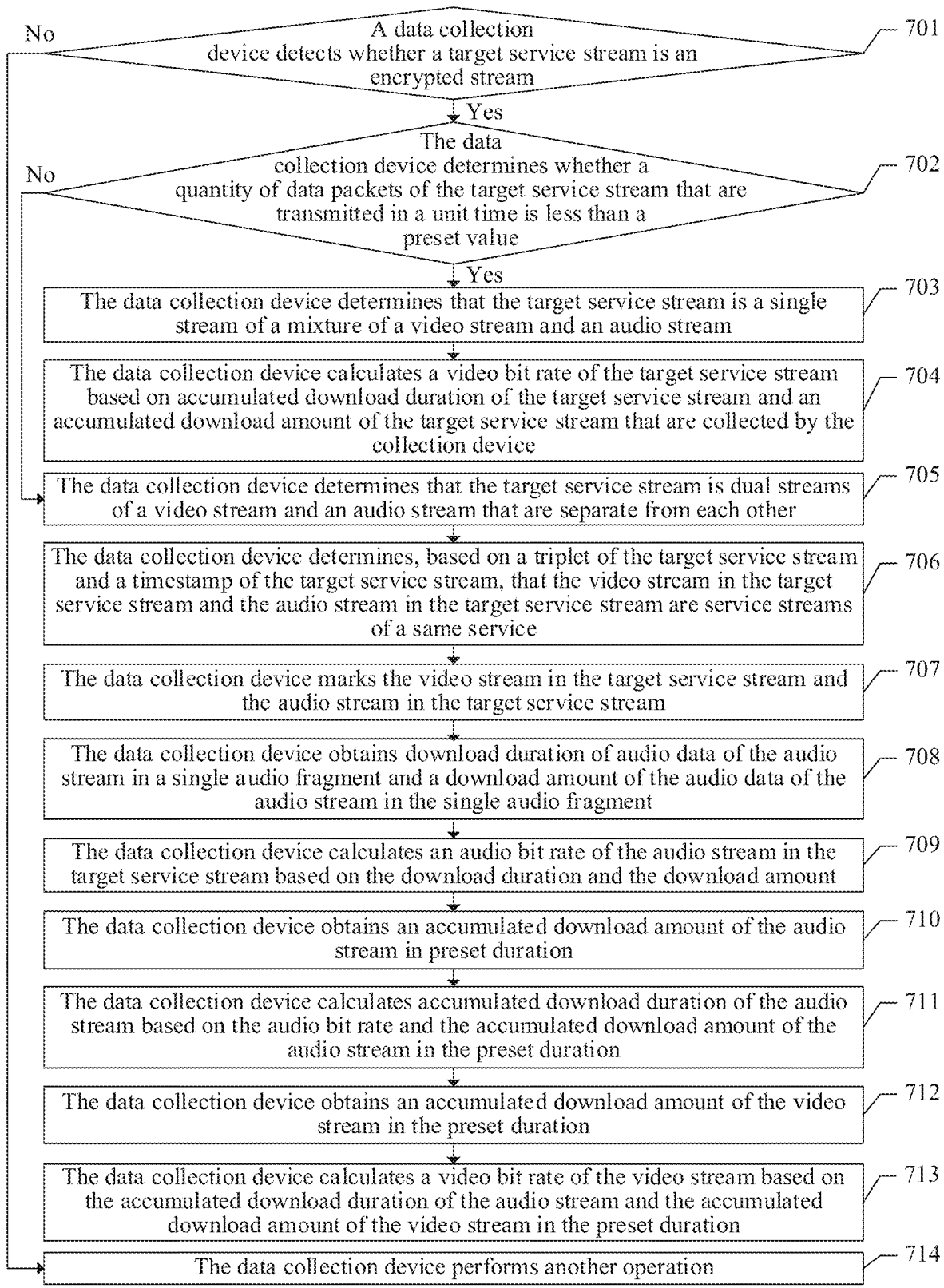
FIG. 7 is a schematic diagram of another embodiment of a data processing method according to an embodiment of this application.

Referring to FIG. 7, in the embodiment in FIG. 7, a data collection device determines a type of a target service stream by determining a quantity of data packets of the target service stream that are transmitted in a unit time, determines a corresponding preset calculation rule based on the type of the target service stream, and then calculates a video bit rate of the target service stream according to the calculation rule. Another embodiment of a data processing method in this embodiment of this application includes the following steps.

701. The data collection device detects whether the target service stream is an encrypted stream; and if the data collection device detects that the target service stream is the encrypted stream, the data collection device performs step 702; or if the data collection device detects that the target service stream is not the encrypted stream, the data collection device performs step 714.

In a TCP network, a user-side STB requests a video service, and an IPTV server sends the target service stream to the user-side STB. When the target service stream is transmitted and passes through network devices deployed at all layers, the data collection device is a data collection device deployed on or deployed in a bypass mode on any one of the network devices. The data collection device may determine, by analyzing the target service stream, whether the target service stream is the encrypted stream. If the data collection device determines that the target service stream is the encrypted stream, the data collection device performs step 702; or if the data collection device determines that the target service stream is not the encrypted stream, the data collection device performs step 714. Specifically, when a TCP connection is performed during transmission of the encrypted stream, a specific protocol is used to perform a handshake to exchange a key. In this case, the data collection device may determine, by identifying a mode used for exchanging the key during transmission of the encrypted stream, that the target service stream is the encrypted stream. In a transmission process of a video service stream, for an unencrypted video service stream, the data collection device may depacketize a packet header of a transmitted packet of the video service stream in a DPI manner, and read a video bit rate of the video service stream from a field in the packet header. However, when the video service stream is transmitted in an encryption manner, the data collection device cannot depacketize the packet header of the video service stream, and therefore cannot read the video bit rate of the video service stream in the DPI manner. Therefore, in this application, when the target service stream is the encrypted stream, a method for obtaining the video bit rate of the target service stream is proposed. Certainly, when the target service stream is an unencrypted stream, the video bit rate may also be obtained by using this method.

702. The data collection device determines whether the quantity of data packets of the target service stream that are transmitted in the unit time is less than a preset value; and if the quantity of data packets of the target service stream that are transmitted in the unit time is less than the preset value, the data collection device performs step 703; or if the quantity of data packets of the target service stream that are transmitted in the unit time is not less than the preset value, the data collection device performs step 705.

The data collection device determines whether the quantity of data packets of the target service stream that are transmitted in the unit time is less than the preset value. If the quantity of data packets of the target service stream that are transmitted in the unit time is less than the preset value, the data collection device performs step 703; or if the quantity of data packets of the target service stream that are transmitted in the unit time is greater than the preset value, the data collection device performs step 705. When a network is in an ideal good status, for a service stream of a single stream type, a data packet is usually transmitted every 10 ms. In this case, a quantity of transmitted data packets of a service stream of a dual stream type should be twice a quantity of transmitted data packets of the service stream of the single stream type. The data collection device may determine whether the quantity of data packets of the target service stream that are transmitted in the unit time is less than the preset value. If the quantity of data packets of the target service stream that are transmitted in the unit time is less than the preset value, the data collection device may determine that the target service stream is a single stream. If the quantity of data packets of the target service stream that are transmitted in the unit time is greater than the preset value, the data collection device may determine that the target service stream is dual streams.

703. The data collection device determines that the target service stream is a single stream of a mixture of a video stream and an audio stream.

If the data collection device determines that the quantity of data packets of the target service stream that are transmitted in the unit time is less than the preset value, the data collection device may determine that the target service stream is the single stream of the mixture of the video stream and the audio stream.

704. The data collection device calculates the video bit rate of the target service stream based on collected accumulated download duration of the target service stream and a collected accumulated download amount of the target service stream.

After the data collection device determines that the target service stream is the single stream, because an audio bit rate is usually less than the video bit rate, the data collection device may directly divide the collected accumulated download amount of the target service stream by the accumulated download time of the target service stream, to calculate an average download rate of the target service stream and fit the average download rate of the target service stream as the video bit rate of the target service stream, where the accumulated download amount and the accumulated download duration are in network KPI data. For example, Table 6 shows a download situation of the target service stream corresponding to the network KPI data. In Table 6, an accumulated download time is obtained by subtracting a download start time from a download end time, and an accumulated download amount is obtained by subtracting a download amount corresponding to the download start time from a download amount corresponding to the download end time.

TABLE 6

| Video ID | VideoSeq | VideoDownOctets | StartTimeSec | EndTimeSec |
|---|---|---|---|---|
| 1337159040 | 1 | 2107148 | 1487333188 | 1487333202 |
| 1337159040 | 2 | 4314256 | 1487333188 | 1487333241 |
| 1337159040 | 3 | 4281412 | 1487333188 | 1487333268 |
| 1337159040 | 4 | 1708943 | 1487333188 | 1487333208 |

TABLE 6-continued

| Video ID | VideoSeq | VideoDownOctets | StartTimeSec | EndTimeSec |
|---|---|---|---|---|
| 1337159040 | 5 | 396777 | 1487333188 | 1487333281 |
| 1337159040 | 6 | 4228576 | 1487333188 | 1487333304 |
| 1337159040 | 7 | 2107148 | 1487333188 | 1487333305 |
| 1337159040 | 8 | 2145704 | 1487333188 | 1487333305 |
| 1337159040 | 9 | 2110004 | 1487333188 | 1487333306 |
| 1337159040 | 10 | 2565163 | 1487333188 | 1487333308 |
| 1337159040 | 11 | 4364236 | 1487333188 | 1487333334 |

Figure 8:
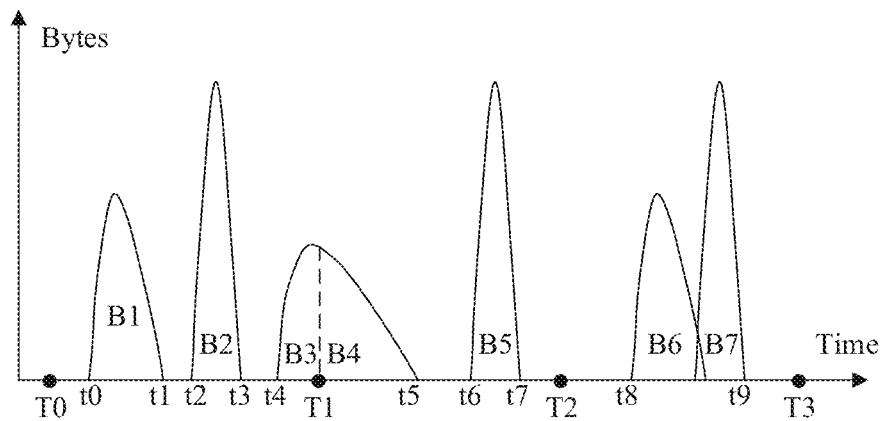
FIG. 8 is a schematic diagram of another scenario of a data processing method according to an embodiment of this application.

Table 6 includes video source information, a video source sequence (VideoSeq), an accumulated video download amount (VideoDownOctets), a download start time (StartTimeSec), and a download end time (EndTimeSec). Based on Table 6, statistics collection on download amounts of the target service stream in all time periods may be performed to obtain a statistical chart shown in FIG. 8. In this case, the video bit rate of the target service stream may be fitted by calculating the average download rate of the target service stream in each time period. For example, video bit rate of the target service stream in a time period from T0 to T1=average download rate MR1=(B1+B2+B3)/(T1−T0), video bit rate of the target service stream in a time period from T1 to T2=average download rate MR2=(B4++B5)/(T2−T1), and video bit rate of the target service stream in a time period from T2 to T3=average download rate MR3=(B6+B7)/(T3−T2). Therefore, the data collection device can calculate the video bit rate of the target service stream based on the accumulated download duration and the accumulated download amount of the target service stream that are obtained from the network KPI data, and the data collection device can collect the video bit rate of the service stream in an encryption scenario. Therefore, for the target service stream of an encrypted single stream type, the data collection device can report the complete network KPI data of the target service stream to a server, including the video bit rate of the target service stream. Therefore, this solution is also applicable to the encryption scenario, and integrity of the solution is improved.

705. The data collection device determines that the target service stream is dual streams of a video stream and an audio stream that are separate from each other.

If the data collection device determines that the quantity of data packets of the target service stream that are transmitted in the unit time is greater than the preset value, the data collection device may determine that the target service stream is the dual streams of the video stream and the audio stream that are separate from each other.

706. The data collection device determines, based on a triplet of the target service stream and a timestamp of the target service stream, that the video stream in the target service stream and the audio stream in the target service stream are service streams of a same service.

After the data collection device determines that the target service stream is the dual streams of the video stream and the audio stream that are separate from each other, the data collection device determines whether a triplet of the video stream is consistent with a triplet of the audio stream. The triplet of the video stream includes a source IP address and a destination IP address of the video stream and a transport protocol for transmitting the video stream. The triplet of the audio stream includes a source IP address and a destination IP address of the audio stream and a transport protocol for transmitting the audio stream. Then, the data collection device determines whether a timestamp of link establishment for the video stream in the TCP network is consistent with a timestamp of link establishment for the audio stream in the TCP network. If the data collection device determines that the triplet of the video stream is consistent with the triplet of the audio stream and that the timestamp for the video stream is consistent with the timestamp for the audio stream, the data collection device may determine that the video stream and the audio stream are the service streams of the same service.

707. The data collection device marks the video stream in the target service stream and the audio stream in the target service stream.

After the data collection device determines that the audio stream in the target service stream and the video stream in the target service stream are the service streams of the same service, the data collection device marks the video stream in the target service stream and the audio stream in the target service stream. Specifically, a size of a data packet for transmitting the audio stream may be far less than a size of a data packet for transmitting the video stream. Therefore, the data collection device may identify and mark the video stream in the target service stream and the audio stream in the target service stream based on a size of a transmitted data packet of the target service stream. A service stream with a relatively large transmitted data packet is the video stream, and a service stream with a relatively small data packet is the audio stream. The data collection device may further identify the video stream in the target service stream and the audio stream in the target service stream in another manner. This is not specifically limited herein.

708. The data collection device obtains download duration of audio data of the audio stream in a single audio fragment and a download amount of the audio data of the audio stream in the single audio fragment.

The data collection device obtains, from network KPI data, the download duration of the audio data of the audio stream, marked in step 707, in the single audio fragment and the download amount of the audio data of the audio stream in the single audio fragment. For example, FIG. 9 includes a horizontal coordinate of a video stream (video) and a horizontal coordinate of an audio stream (audio). Download duration of the audio stream in a single audio fragment is $T_{chunk}$, a download amount of the audio stream in the single audio fragment is $Octets_{chunk}$, and an initial time is $t_0$.

709. The data collection device calculates an audio bit rate of the audio stream in the target service stream based on the download duration and the download amount.

Audio is usually coded at a constant bit rate. Therefore, the data collection device may divide the download amount of the audio data in the single audio fragment by the download duration of the audio data in the single audio fragment to obtain the audio bit rate of the target service stream. A calculation formula (1.4) is as follows:

$$Ratio_{audio} = Octets_{chunk}/T_{chunk} \quad (1.4)$$

In Formula (1.4), $Ratio_{audio}$ is the audio bit rate of the audio stream, $Octets_{chunk}$ is the download amount of the audio stream in the single audio fragment, and $T_{chunk}$ is the download time of the audio data of the audio stream in the single audio fragment.

710. The data collection device obtains an accumulated download amount of the audio stream in preset duration.

Figure 9:
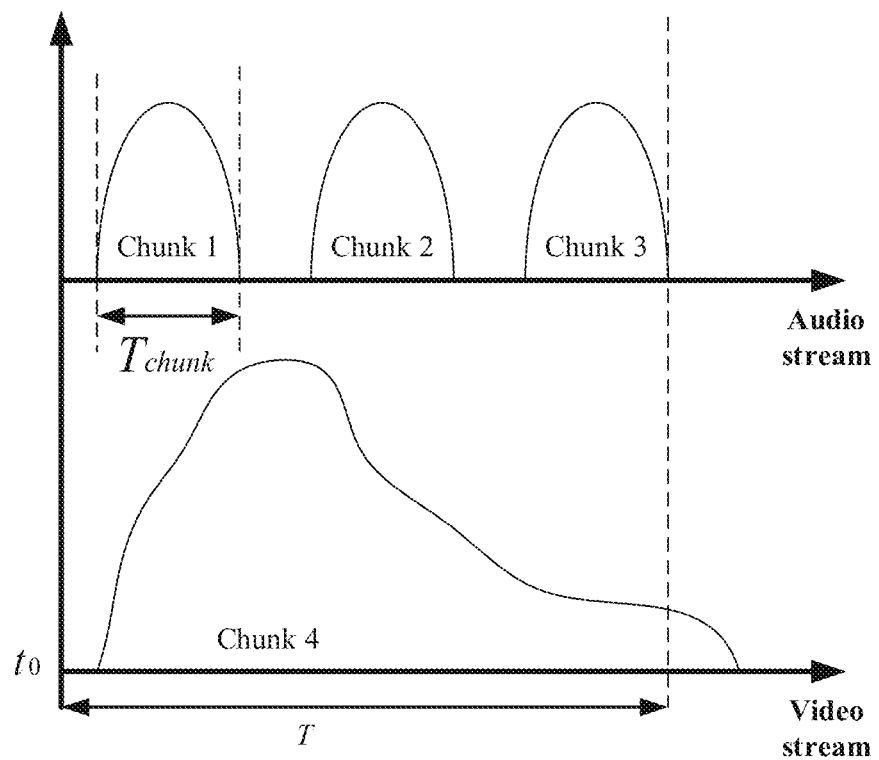
FIG. 9 is a schematic diagram of another scenario of a data processing method according to an embodiment of this application.

The data collection device obtains the accumulated download amount of the marked audio stream in the preset duration from the network KPI data of the target service stream. As shown in FIG. 9, the preset duration is specified as a time T, and the data collection device collects the accumulated download amount Octets$_{chunk}$ of the audio stream in the time T.

711. The data collection device calculates accumulated download duration of the audio stream based on the audio bit rate and the accumulated download amount of the audio stream in the preset duration.

The data collection device divides the accumulated download amount of the audio stream in the preset duration by the audio bit rate to obtain the accumulated download duration of the audio stream. To be specific, the accumulated download duration of the audio stream may be considered as a play time of the audio stream. For example, in FIG. 9, the data collection device divides the accumulated download amount of the audio stream in the time T by the time T to obtain the play time of the audio stream. Formula (1.5) is as follows:

$$T_{play} = \text{Octets}_{audio}(t_0, T)/\text{Ratio}_{audio} \qquad (1.5)$$

In Formula (1.5), $T_{play}$ is the accumulated download duration of the audio stream, Octets$_{audio}(t_0, T)$ is the accumulated download amount of the audio stream in the preset duration T, and Ratio$_{audio}$ is the audio bit rate of the audio stream.

712. The data collection device obtains an accumulated download amount of the video stream in the preset duration.

The data collection device obtains the accumulated download amount in the preset duration from the network KPI data of the video stream marked in the target service stream. For example, in FIG. 9, the data collection device obtains the accumulated download amount Octets$_{video}(t_0,T)$ of the video stream in the time T.

713. The data collection device calculates a video bit rate of the video stream based on the accumulated download duration of the audio stream and the accumulated download amount of the video stream in the preset duration.

The data collection device divides the accumulated download amount of the video stream in the preset duration by the accumulated download duration of the audio stream to obtain the video bit rate of the video stream. A calculation formula (1.6) is as follows:

$$\text{Ratio}_{video}(t_0, T) \approx \text{Octets}_{video}(t_0, T)/T_{play} \qquad (1.6)$$

In Formula (1.6) Ratio$_{video}(t_0,T)$ is the video bit rate of the video stream, Octets$_{video}(t_0, T)$ is the accumulated download amount of the video stream in the preset duration T, and $T_{play}$ is the accumulated download duration of the audio stream. Therefore, for the target service stream that is the dual streams of the video stream and the audio stream that are separate from each other, the data collection device calculates the audio bit rate of the audio stream, and then indirectly calculates the video bit rate of the video stream based on the audio bit rate. Therefore, the data collection device can obtain the video bit rate of the service stream of the encrypted dual stream type. In other words, the data collection device can report the complete network KPI data of the target service stream to a server, including the video bit rate of the target service stream. Subsequently, the server side can calculate video QoE of the target service stream based on the network KPI data. Therefore, this solution is also applicable to calculation of the video bit rate of the service stream that is dual streams of the video stream and the audio stream that are separate from each other in an encryption scenario. Therefore, integrity of the solution is improved.

714. The data collection device performs another operation.

After the data collection device determines that the target service stream is the unencrypted stream, the data collection device performs the another operation. Specifically, the data collection device may obtain the video bit rate of the target service stream in a DPI manner.

In this embodiment of this application, the data collection device determines that the target service stream is the encrypted stream, then the data collection device detects the type of the target service stream, the data collection device determines the target calculation rule based on the type of the target service stream, and the data collection device may calculate the video bit rate of the target service stream according to the target calculation rule. To be specific, the data collection device identifies the encrypted target service stream, detects the type of the target service stream, determines the target calculation rule corresponding to the type of the target service stream, and then calculates the video bit rate of the target service stream according to the target calculation rule. In this way, the video bit rate of the encrypted service stream is collected. The data collection device can provide the server with the network KPI data of the encrypted service stream, including the video bit rate of the service stream, so that the server in this application can also calculate the video QoE of the encrypted video service stream subsequently, thereby improving integrity of the solution.

Figure 10:
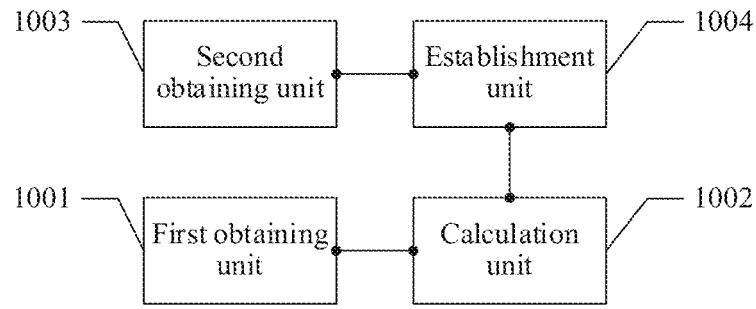
FIG. 10 is a schematic structural diagram of a server according to an embodiment of this application.

The foregoing describes the data processing method in the embodiments of this application. The following describes a server in the embodiments of this application. Referring to FIG. 10, a second obtaining unit 1003 and an establishment unit 1004 are optional units. An embodiment of the server in the embodiment of this application includes:

a first obtaining unit 1001, configured to obtain first network key performance indicator KPI data and performance data of a first STB, where the first network KPI data is network KPI data of a first video service stream, and the first STB is an STB that receives the first video service stream; and a calculation unit 1002, configured to calculate first video quality of experience QoE of the first video service stream based on an associated model, the first network KPI data, and the performance data of the first STB, where the associated model is a model obtained through training based on historical data, and the associated model is used by the server to calculate video QoE based on network KPI data and performance data of an STB.

In this embodiment, the server further includes:

the second obtaining unit 1003, configured to obtain historical network KPI data, historical performance data, and historical video QoE, where the historical network KPI data includes network KPI data of a plurality of video service streams, the historical performance data includes performance data of STBs that receive the plurality of video service streams, and the historical video QoE includes video QoE of the plurality of video service streams; and the establishment unit 1004, configured to establish the associated model based on the historical network KPI data, the historical performance data, and the historical video QoE.

In this embodiment, the historical performance data includes initial buffer sizes of the STBs that receive the plurality of video service streams, and the historical network KPI data includes PLRs of the plurality of video service streams, RTTs of the plurality of video service streams, and video bit rates of the plurality of video service streams.

In this embodiment, the performance data of the first STB includes an initial buffer size of the first STB, and the first network KPI data includes a PLR of the first video service stream, an RTT of the first video service stream, and a video bit rate of the first video service.

In this embodiment of this application, the first obtaining unit 1001 obtains the first network KPI data and the performance data of the first STB, where the first network KPI data is the network KPI data of the first video service stream, and the first video service stream is associated with the first STB. Then, the calculation unit 1002 calculates the first video QoE of the first video service stream based on the associated model, the first network KPI data, and the performance data of the first STB. The associated model is the model obtained through training based on the historical data, and the associated model is used by the calculation unit 1002 to calculate the video QoE based on the network KPI data and the performance data of the STB. Therefore, the first obtaining unit 1001 obtains the first network KPI data and the performance data of the first STB, and the calculation unit 1002 may calculate the video QoE of the first video service stream based on the associated model, the first network KPI data, and the performance data of the first STB. In this way, the STB is no longer used to collect a video stalling duration ratio, and no longer calculate the video QoE based on the video stalling duration ratio, thereby greatly reducing load of the STB.

Figure 11:
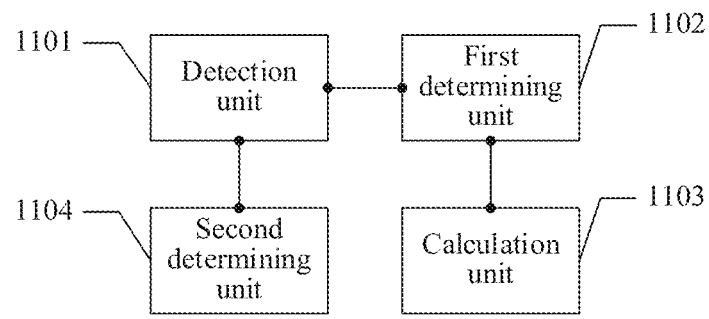
FIG. 11 is a schematic structural diagram of a data collection device according to an embodiment of this application.

The foregoing describes the data processing method in the embodiments of this application. The following describes a data collection device in the embodiments of this application. Referring to FIG. 11, a second determining unit 1104 is an optional unit. An embodiment of the data collection device in the embodiments of this application includes:

a detection unit 1101, configured to detect a type of a target service stream;

a first determining unit 1102, configured to determine a target calculation rule based on the type of the target service stream; and a calculation unit 1103, configured to calculate a video bit rate of the target service stream according to the target calculation rule.

In this embodiment, the type of the target service stream is a single stream of a mixture of a video stream and an audio stream, and the target calculation rule is a first preset calculation rule.

In this embodiment, the calculation unit 1103 is specifically configured to:

calculate the video bit rate of the target service stream based on accumulated download duration of the target service stream and an accumulated download amount of the target service stream that are obtained by the data collection device.

In this embodiment, the type of the target service stream is dual streams of a video stream and an audio stream that are separate from each other, and the target calculation rule is a second preset rule.

In this embodiment, the calculation unit 1103 is specifically configured to:

determine that the video stream in the target service stream and the audio stream in the target service stream are service streams of a same service; determine an audio bit rate of the audio stream in the target service stream; and calculate a video bit rate of the video stream in the target service stream based on the audio bit rate.

In this embodiment, the calculation unit 1103 is specifically configured to:

calculate the audio bit rate of the audio stream in the target service stream based on download duration of audio data of the audio stream in the target service stream in a single audio fragment and a download amount of the audio data of the audio stream in the target service stream in the single audio fragment.

In this embodiment, the calculation unit 1103 is specifically configured to:

calculate accumulated download duration of the audio stream in the target service stream based on the audio bit rate of the audio stream in the target service stream and an accumulated download amount of the audio stream in the target service stream in preset duration; and calculate the video bit rate of the video stream in the target service stream based on the accumulated download duration of the audio stream in the target service stream and an accumulated download amount of the video stream in the target service stream in the preset duration.

In this embodiment, the data collection device further includes:

the second determining unit 1104, configured to determine that the target service stream is an encrypted stream.

In this embodiment, the second determining unit 1104 is specifically configured to:

detect a quantity of data packets of the target service stream that are transmitted in a unit time; and if the quantity of data packets of the target service stream that are transmitted in the unit time is less than a preset value, determine that the target service stream is the single stream of the mixture of the video stream and the audio stream; or if the quantity of data packets of the target service stream that are transmitted in the unit time is greater than the preset value, determine that the target service stream is the dual streams of the video stream and the audio stream that are separate from each other.

In this embodiment of this application, the detection unit 1101 detects the type of the target service stream, the first determining unit 1102 determines the target calculation rule based on the type of the target service stream, and the calculation unit 1103 may calculate the video bit rate of the target service stream according to the target calculation rule. Therefore, the detection unit 1101 detects the type of the target service stream, the first determining unit 1102 determines the target calculation rule corresponding to the type of the target service stream, and then the calculation unit 1103 calculates the video bit rate of the target service stream according to the target calculation rule. In this way, the video bit rate of the video service stream is collected. The data collection device can provide a server with network KPI data of the video service stream, including the video bit rate of the video service stream.

Figure 12:
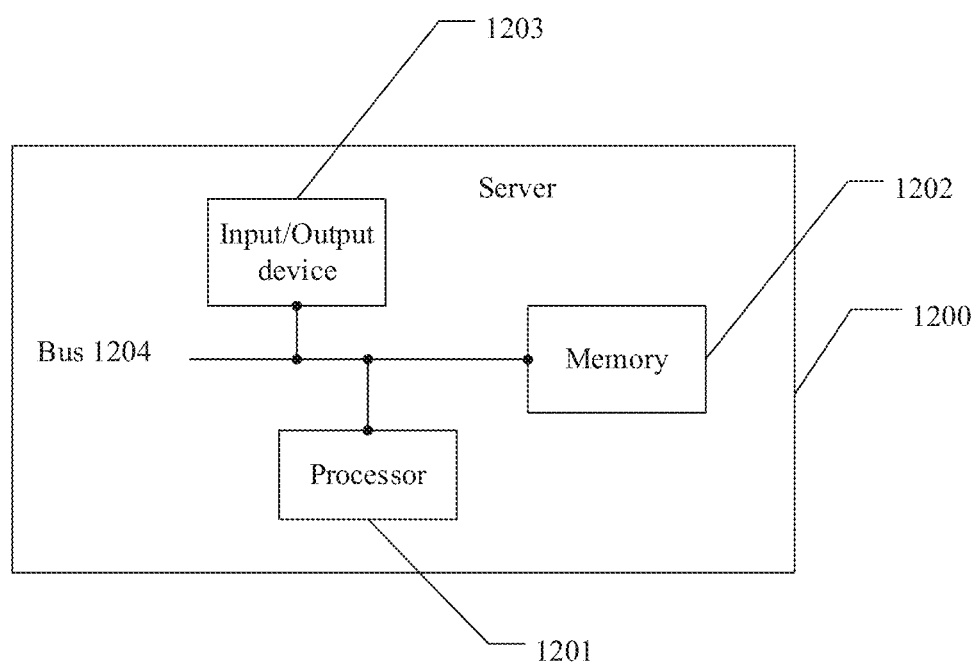
FIG. 12 is another schematic structural diagram of a server according to an embodiment of this application.

This application further provides a server 1200. Referring to FIG. 12, an embodiment of the server in an embodiment of this application includes:

a processor 1201, a memory 1202, an input/output device 1203, and a bus 1204.

The processor 1201, the memory 1202, and the input/output device 1203 are separately connected to the bus 1204, and the memory stores a computer instruction.

The input/output device 1203 is configured to obtain first network key performance indicator KPI data and performance data of a first STB, where the first network KPI data is network KPI data of a first video service stream, and the first STB is an STB that receives the first video service stream.

The processor 1201 is configured to calculate first video quality of experience QoE of the first video service stream based on an associated model, the first network KPI data, and the performance data of the first STB, where the associated model is a model obtained through training based on historical data, and the associated model is used by the server to calculate video QoE based on network KPI data and performance data of an STB.

In a possible implementation, the processor 1201 is further configured to:

obtain historical network KPI data, historical performance data, and historical video QoE, where the historical network KPI data includes network KPI data of a plurality of video service streams, the historical performance data includes performance data of STBs that receive the plurality of video service streams, and the historical video QoE includes video QoE of the plurality of video service streams; and establish the associated model based on the historical network KPI data, the historical performance data, and the historical video QoE.

In another possible implementation, the historical performance data includes initial buffer sizes of the STBs that receive the plurality of video service streams, and the historical network KPI data includes PLRs of the plurality of video service streams, RTTs of the plurality of video service streams, and video bit rates of the plurality of video service streams.

In another possible implementation, the performance data of the first STB includes an initial buffer size of the first STB, and the first network KPI data includes a PLR of the first video service stream, an RTT of the first video service stream, and a video bit rate of the first video service.

Figure 13:
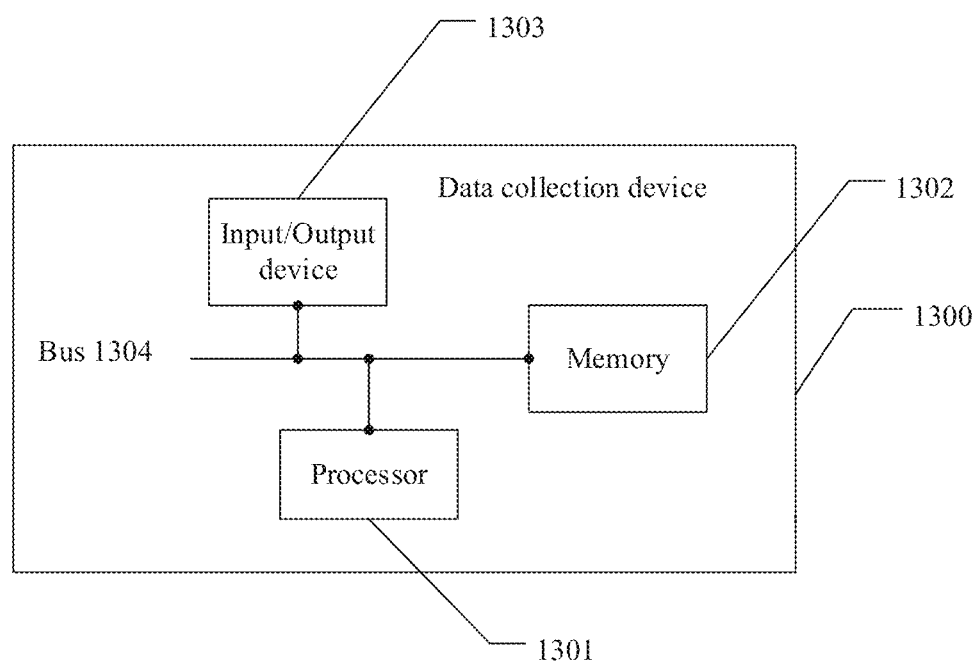
FIG. 13 is another schematic structural diagram of a data collection device according to an embodiment of this application.

This application further provides a data collection device 1300. Referring to FIG. 13, an embodiment of a server in an embodiment of this application includes:

a processor 1301, a memory 1302, an input/output device 1303, and a bus 1304.

The processor 1301, the memory 1302, and the input/output device 1303 are separately connected to the bus 1304, and the memory 1302 stores a computer instruction.

The processor 1301 is configured to: detect a type of a target service stream; determine a target calculation rule based on the type of the target service stream; and calculate a video bit rate of the target service stream according to the target calculation rule.

In a possible implementation, the type of the target service stream is a single stream of a mixture of a video stream and an audio stream, and the target calculation rule is a first preset calculation rule.

In another possible implementation, the processor 1301 is specifically configured to:

calculate the video bit rate of the target service stream based on accumulated download duration of the target service stream and an accumulated download amount of the target service stream that are obtained by the data collection device.

In another possible implementation, the type of the target service stream is dual streams of a video stream and an audio stream that are separate from each other, and the target calculation rule is a second preset rule.

In another possible implementation, the processor 1301 is specifically configured to:

determine that the video stream in the target service stream and the audio stream in the target service stream are service streams of a same service; determine an audio bit rate of the audio stream in the target service stream; and calculate a video bit rate of the video stream in the target service stream based on the audio bit rate.

In another possible implementation, the processor 1301 is specifically configured to:

calculate the audio bit rate of the audio stream in the target service stream based on download duration of audio data of the audio stream in the target service stream in a single audio fragment and a download amount of the audio data of the audio stream in the target service stream in the single audio fragment.

In another possible implementation, the processor 1301 is specifically configured to:

calculate accumulated download duration of the audio stream in the target service stream based on the audio bit rate of the audio stream in the target service stream and an accumulated download amount of the audio stream in the target service stream in preset duration; and calculate the video bit rate of the video stream in the target service stream based on the accumulated download duration of the audio stream in the target service stream and an accumulated download amount of the video stream in the target service stream in the preset duration.

In another possible implementation, the processor 1301 is further configured to:

determine that the target service stream is an encrypted stream.

In another possible implementation, the processor 1301 is specifically configured to:

detect a quantity of data packets of the target service stream that are transmitted in a unit time; and if the quantity of data packets of the target service stream that are transmitted in the unit time is less than a preset value, determine that the target service stream is the single stream of the mixture of the video stream and the audio stream; or if the quantity of data packets of the target service stream that are transmitted in the unit time is greater than the preset value, determine that the target service stream is the dual streams of the video stream and the audio stream that are separate from each other.

It may be clearly understood by a person skilled in the art that for convenient and brief description, for a detailed working process of the described system, apparatus, and unit, refer to a corresponding process in the foregoing method embodiments, and details are not described herein again.

In another possible design, when the server or the data collection device is a chip in a terminal, the chip includes a processing unit and a communications unit. The processing unit may be, for example, a processor. The communications unit may be, for example, an input/output interface, a pin, or a circuit. The processing unit may execute a computer executable instruction stored in a storage unit, so that the chip in the terminal performs the data processing method in any one of the first aspect or the second aspect. Optionally, the storage unit may be a storage unit in the chip, such as a register or a buffer, or the storage unit may be a storage unit in the terminal but outside the chip, such as a read-only memory (ROM), another type of static storage device capable of storing static information and instructions, or a random access memory (RAM).

Any one of the processors mentioned above may be a general-purpose central processing unit (CPU), a microprocessor, an application-specific integrated circuit (ASIC), or one or more integrated circuits configured to control execution of a program for the data processing method in any one of the first aspect or the second aspect.

All or some of the foregoing embodiments may be implemented by using software, hardware, firmware, or any combination thereof. When the embodiments are implemented by using software, all or some of the embodiments may be implemented in a form of a computer program product.

The computer program product includes one or more computer instructions. When the computer program instructions are loaded and executed on a computer, all or some of the procedures or the functions according to the embodiments of the present invention are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, including one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

In the several embodiments provided in this application, it should be understood that the disclosed system, apparatus, and method may be implemented in other manners. For example, the described apparatus embodiments are merely examples. For example, division into the units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or another form.

The units described as separate components may or may not be physically separate, and components displayed as units may or may not be physical units. To be specific, the components may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, the technical solutions of this application essentially, or the part contributing to the prior art, or all or some of the technical solutions may be implemented in a form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, and an optical disc.

The foregoing embodiments are merely intended for describing the technical solutions of this application, but not for limiting this application. Although this application is described in detail with reference to the foregoing embodiments, a person of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. A data processing method, wherein the method comprises:
    obtaining, by a server, first network key performance indicator (KPI) data, wherein the first network KPI data is network KPI data of a first video service stream;
    obtaining first performance data of a first set-top box (STB), wherein the first STB receives the first video service stream; and
    calculating, by the server, first video quality of experience (QoE) of the first video service stream based on an associated model, the first network KPI data, and the first performance data of the first STB, wherein the first network KPI data includes a maximum segment size of packets used in transmitting the first video service stream, a round trip time (RRT) of the first video service stream, and a packet loss rate of the first video service stream, and wherein the associated model is a model obtained through training based on second network KPI data and based on second video QoE and second performance data provided by the first STB, and the associated model is used by the server to calculate the first video QoE based on the first network KPI data and the first performance data of the first STB.

2. The method according to claim 1, wherein before the calculating, by the server, first video QoE of the first video service stream based on an associated model, the first network KPI data, and the first performance data of the first STB, the method further comprises:
    obtaining, by the server, historical network KPI data, historical performance data, and historical video QoE, wherein the historical network KPI data comprises network KPI data of a plurality of video service streams, the historical performance data comprises performance data of STBs that receive the plurality of video service streams, and the historical video QoE comprises video QoE of the plurality of video service streams; and
    establishing, by the server, the associated model based on the historical network KPI data, the historical performance data, and the historical video QoE.

3. The method according to claim 2, wherein the historical performance data comprises initial buffer sizes of the STBs that receive the plurality of video service streams, and the historical network KPI data comprises video packet loss rates (PLRs) of the plurality of video service streams, round trip times (RTTs) of the plurality of video service streams, and video bit rates of the plurality of video service streams.

4. The method according to claim 1, wherein the first performance data of the first STB comprises an initial buffer size of the first STB, and the first network KPI data comprises a video packet loss rate (PLR) of the first video service stream, a round trip time (RTT) of the first video service stream, and a video bit rate of the first video service.

5. A server, wherein the server comprises:
a processor; and
a computer readable medium that contains computer-executable instructions;
the processor is configured to execute the computer-executable instructions to enable the server to:
obtain first network key performance indicator (KPI) data, wherein the first network KPI data is network KPI data of a first video service stream;
obtaining first performance data of a first set-top box (STB), wherein the first STB receives the first video service stream; and
calculate first video quality of experience (QoE) of the first video service stream based on an associated model, the first network KPI data, and the performance data of the first STB, wherein the first network KPI data includes a maximum segment size of packets used in transmitting the first video service stream, a round trip time of the first video service stream, and a packet loss rate of the first video service stream, and wherein the associated model is a model obtained through training based on second network KPI data and based on second video QoE and second performance data provided by the first STB, and the associated model is used by the server to calculate the first video QoE based on the first network KPI data and the first performance data of the first STB.

6. The server according to claim 5, wherein the processor is further configured to:
obtain historical network KPI data, historical performance data, and historical video QoE, wherein the historical network KPI data comprises network KPI data of a plurality of video service streams, the historical performance data comprises performance data of STBs that receive the plurality of video service streams, and the historical video QoE comprises video QoE of the plurality of video service streams; and
establish the associated model based on the historical network KPI data, the historical performance data, and the historical video QoE.

7. The server according to claim 6, wherein the historical performance data comprises initial buffer sizes of the STBs that receive the plurality of video service streams, and the historical network KPI data comprises video packet loss rates (PLRs) of the plurality of video service streams, round trip times (RTTs) of the plurality of video service streams, and video bit rates of the plurality of video service streams.

8. The server according to claim 5, wherein the performance data of the first STB comprises an initial buffer size of the first STB, and the first network KPI data comprises a video packet loss rate (PLR) of the first video service stream, a round trip time (RTT) of the first video service stream, and a video bit rate of the first video service.

* * * * *

UNITED STATES PATENT AND TRADEMARK OFFICE
CERTIFICATE OF CORRECTION

PATENT NO. : 11,936,930 B2
APPLICATION NO. : 16/986887
DATED : March 19, 2024
INVENTOR(S) : Haonan Ye et al.

It is certified that error appears in the above-identified patent and that said Letters Patent is hereby corrected as shown below:

In the Claims

In Column 30, Line 29, in Claim 1, delete "(RRT)" and insert -- (RTT) --.

Signed and Sealed this
Fourteenth Day of May, 2024

Katherine Kelly Vidal
*Director of the United States Patent and Trademark Office*